United States Patent
El-Siblani et al.

(10) Patent No.: US 10,414,090 B2
(45) Date of Patent: *Sep. 17, 2019

(54) METHOD OF STABILIZING A PHOTOHARDENING INHIBITOR-PERMEABLE FILM IN THE MANUFACTURE OF THREE-DIMENSIONAL OBJECTS

(71) Applicant: Global Filtration Systems, Dearborn Heights, MI (US)

(72) Inventors: Ali El-Siblani, Dearborn Heights, MI (US); Alexandr Shkolnik, Los Angeles, CA (US); Andrius Raulinaitis, Long Beach, CA (US)

(73) Assignee: Global Filtration Systems, Dearborn Heights, MI (US)

( * ) Notice: Subject to any disclaimer, the term of this patent is extended or adjusted under 35 U.S.C. 154(b) by 144 days.

This patent is subject to a terminal disclaimer.

(21) Appl. No.: 15/729,050

(22) Filed: Oct. 10, 2017

(65) Prior Publication Data

US 2019/0099947 A1    Apr. 4, 2019

Related U.S. Application Data

(63) Continuation-in-part of application No. 15/722,540, filed on Oct. 2, 2017, now abandoned.

(51) Int. Cl.
*B29C 64/124* (2017.01)
*B29C 64/291* (2017.01)
(Continued)

(52) U.S. Cl.
CPC .......... *B29C 64/124* (2017.08); *B29C 64/135* (2017.08); *B29C 64/255* (2017.08);
(Continued)

(58) Field of Classification Search
CPC ... B29C 64/124; B29C 64/129; B29C 64/135; B29C 64/25; B29C 64/255
See application file for complete search history.

(56) References Cited

U.S. PATENT DOCUMENTS 5,391,072 A * 2/1995 Lawton ................ B29C 64/129
                                              264/401
5,545,367 A * 8/1996 Bae ..................... B33Y 50/02
                                              264/401

(Continued)

FOREIGN PATENT DOCUMENTS

WO    2016115236 A1    7/2016

OTHER PUBLICATIONS

International Search Report and Written Opinion for PCT/US2018/050670 dated Nov. 28, 2018.

*Primary Examiner* — Atul P. Khare
(74) *Attorney, Agent, or Firm* — Hansen IP Law PLLC

(57) ABSTRACT

A method and apparatus for making a three-dimensional object by solidifying a photohardenable material are shown and described. A photohardening inhibitor is admitted into a surface of a photohardenable material through a flexible film to create a "non-solidification zone" where little or no solidification occurs. The non-solidification zone prevents the exposed surface of the photohardenable material from solidifying in contact with the film. The inhibitor tends to cause the film to deform along the build axis, thereby creating a non-planar interface between the photohardenable material and the film, which distorts the resulting three-dimensional object. An apparatus is provided to stabilize the flexible film and eliminate or minimize such deformation.

31 Claims, 9 Drawing Sheets

(51) Int. Cl.
  *B33Y 30/00*   (2015.01)
  *B33Y 70/00*   (2015.01)
  *B33Y 10/00*   (2015.01)
  *B29C 64/135*  (2017.01)
  *B29C 64/255*  (2017.01)
  *B29K 105/00*  (2006.01)
  *B29C 64/165*  (2017.01)

(52) U.S. Cl.
  CPC ............ *B29C 64/291* (2017.08); *B33Y 10/00* (2014.12); *B33Y 30/00* (2014.12); *B33Y 70/00* (2014.12); *B29C 64/165* (2017.08); *B29K 2105/0058* (2013.01); *B29K 2883/00* (2013.01)

(56)            References Cited

U.S. PATENT DOCUMENTS

| | | | |
|---|---|---|---|
| 9,205,601 B2 * | 12/2015 | DeSimone | G03F 7/0037 |
| 9,360,757 B2 * | 6/2016 | DeSimone | B33Y 10/00 |
| 9,486,964 B2 * | 11/2016 | Joyce | B29C 64/35 |
| 9,498,920 B2 | 11/2016 | DeSimone et al. | |
| 9,676,963 B2 * | 6/2017 | Rolland | B33Y 10/00 |
| 9,975,295 B2 * | 5/2018 | Rolland | B33Y 10/00 |
| 2001/0042471 A1 | 11/2001 | Randazzo | |
| 2013/0292862 A1 | 11/2013 | Joyce | |
| 2015/0034007 A1 * | 2/2015 | Fischer | B05C 9/12 |
| | | | 118/620 |
| 2015/0072293 A1 | 3/2015 | DeSimone et al. | |
| 2016/0067921 A1 | 3/2016 | Willis et al. | |
| 2016/0137839 A1 | 5/2016 | Rolland et al. | |
| 2016/0160077 A1 | 6/2016 | Rolland et al. | |
| 2016/0167301 A1 | 6/2016 | Cole et al. | |
| 2016/0200052 A1 * | 7/2016 | Moore | B29C 67/0092 |
| | | | 264/401 |
| 2016/0303795 A1 | 10/2016 | Liu et al. | |

\* cited by examiner

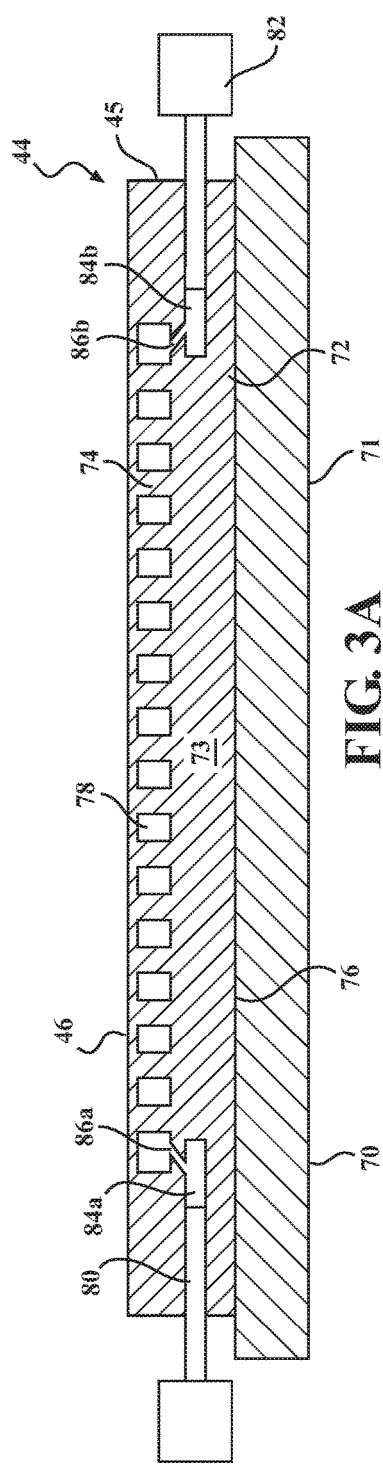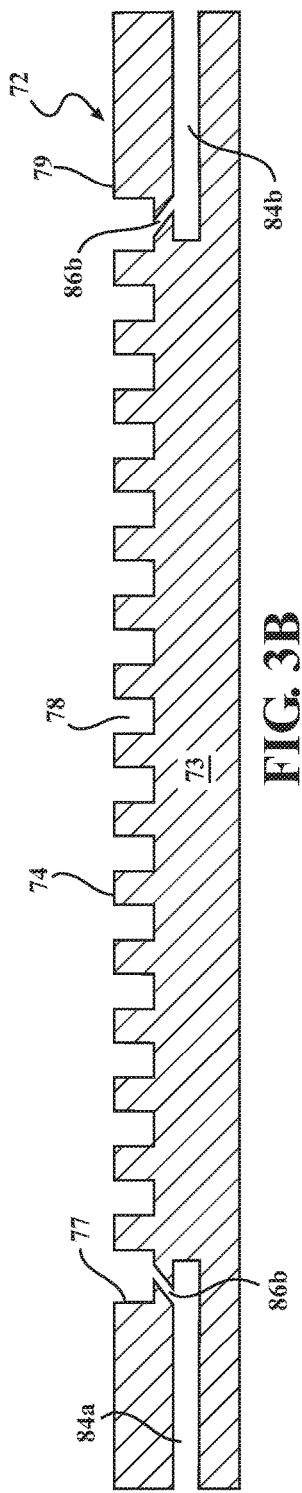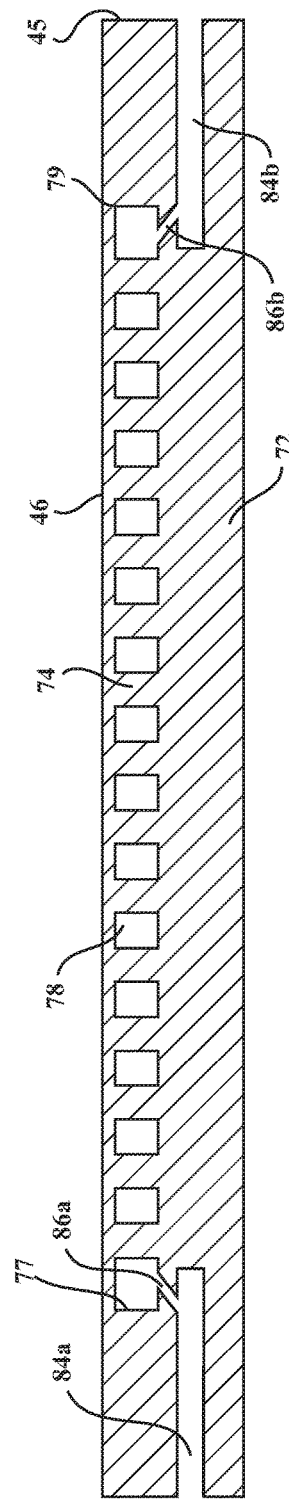

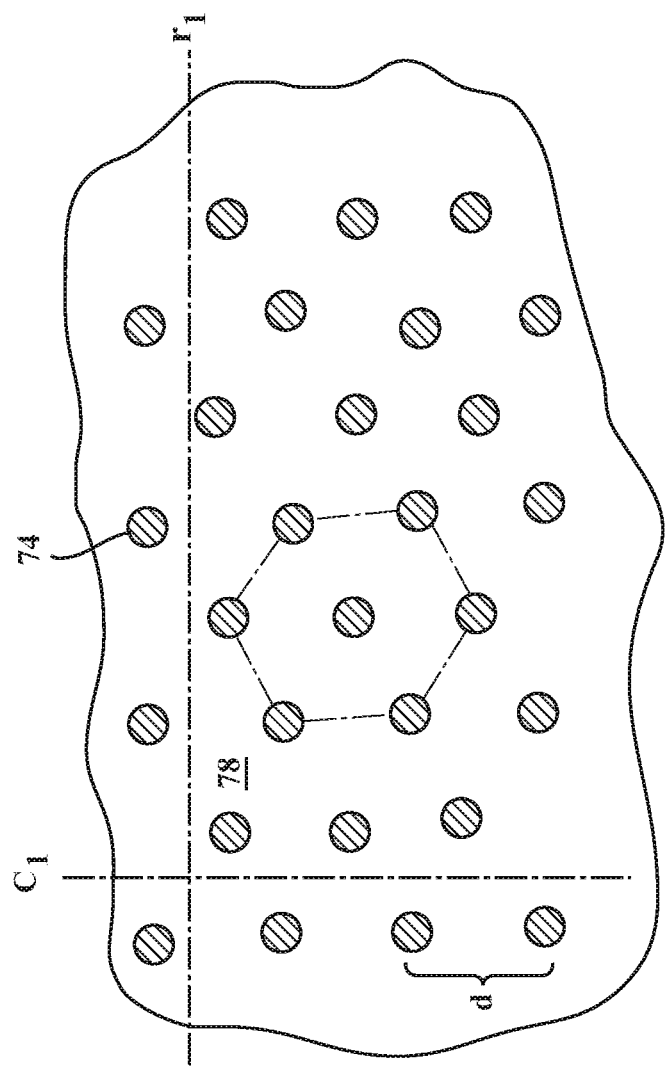

METHOD OF STABILIZING A PHOTOHARDENING INHIBITOR-PERMEABLE FILM IN THE MANUFACTURE OF THREE-DIMENSIONAL OBJECTS

CROSS-REFERENCE TO RELATED APPLICATIONS

This application is a continuation-in-part of U.S. patent application Ser. No. 15/722,540, filed on Oct. 2, 2017.

FIELD

The disclosure relates to a system and method for manufacturing three-dimensional objects, and more specifically, to a system and method of stabilizing a film that is permeable to a photohardening inhibitor to minimize its deformation. Such deformation is undesirable as it tends to distort the planarity of the photohardenable material/film interface and yield inaccurate objects.

DESCRIPTION OF THE RELATED ART

Three-dimensional rapid prototyping and manufacturing allows for quick and accurate production of components at high accuracy. Machining steps may be reduced or eliminated using such techniques and certain components may be functionally equivalent to their regular production counterparts depending on the materials used for production.

The components produced may range in size from small to large parts. The manufacture of parts may be based on various technologies including photo-polymer hardening using light or laser curing methods. Secondary curing may take place with exposure to, for example, ultraviolet (UV) light. A process to convert a computer aided design (CAD) data to a data model suitable for rapid manufacturing may be used to produce data suitable for constructing the component. Then, a pattern generator may be used to construct the part. An example of a pattern generator may include the use of DLP (Digital Light Processing technology) from Texas Instruments®, SXRD™ (Silicon X-tal Reflective Display), LCD (Liquid Crystal Display), LCOS (Liquid Crystal on Silicon), DMD (digital mirror device), J-ILA from JVC, SLM (Spatial light modulator) or any type of selective light modulation system.

In certain three-dimensional object manufacturing processes, it is important to ensure that the solidifiable material (e.g., polymeric resin) used to make the object forms a smooth and substantially planar surface to which solidification energy from a pattern generator will be applied. One technique uses an "upside down" build process in which an object is built progressively in the downward build (z) axis direction (toward the earth) as the build platform is progressively elevated in the upward build (z) axis direction. A basin holding the solidifiable material, such as a photohardenable material, has a transparent bottom through which solidification energy is projected to solidify the photohardenable material in patterns corresponding to cross-sections of the three-dimensional object. However, because the solidification energy is incident at the bottom of the basin, photohardenable material solidifies in contact with the basin and must be separated without damaging the object.

Certain known methods involve the creation of a "dead zone"—where no solidification occurs—in a thin region at the interface between the photohardenable material and a photohardening inhibitor-permeable film that defines the bottom of the basin. These methods avoid the need for a means to separate the solidified object from the bottom of the basin. The methods typically involve feeding a photohardening inhibitor through the film. The inhibitor typically reacts with or consumes a photohardening initiator such that polymerization and/or crosslinking cannot occur within the dead zone. The inhibitor is fed at a rate that affects the thickness of the dead zone. Because no separation step is required, some of the methods move the build platform continuously upward along the build axis to accelerate the build process. However, in some cases, the influx of the inhibitor deforms the inhibitor-permeable film, which disrupts the planarity of the interface between the film and the photohardening material. The data used to drive the photohardening process is generated based on a planar interface. The distortion of the film planarity may cause inaccuracies in the resulting objects relative to the data that defines them. Thus, a need has arisen for a system and method of making three-dimensional objects which addresses the foregoing issues.

BRIEF DESCRIPTION OF THE DRAWINGS

The disclosure will now be described, by way of example, with reference to the accompanying drawings, in which:

FIG. 3A is a close-up, side-elevational view of the photohardening inhibitor delivery device used in the photohardenable material container assembly of FIG. 2A;

FIG. 3B is a close-up, side-elevational view of the photohardening inhibitor reservoir used in the photohardening inhibitor delivery device of FIG. 3A;

FIG. 3C is a close-up, side-elevational, view of the photohardening inhibitor reservoir and photohardening inhibitor permeable film used in the photohardening inhibitor delivery device of FIG. 3A;

FIG. 4 is a top plan view of the supports of the photohardening inhibitor reservoir of FIG. 3B;

DETAILED DESCRIPTION

Figure 1:
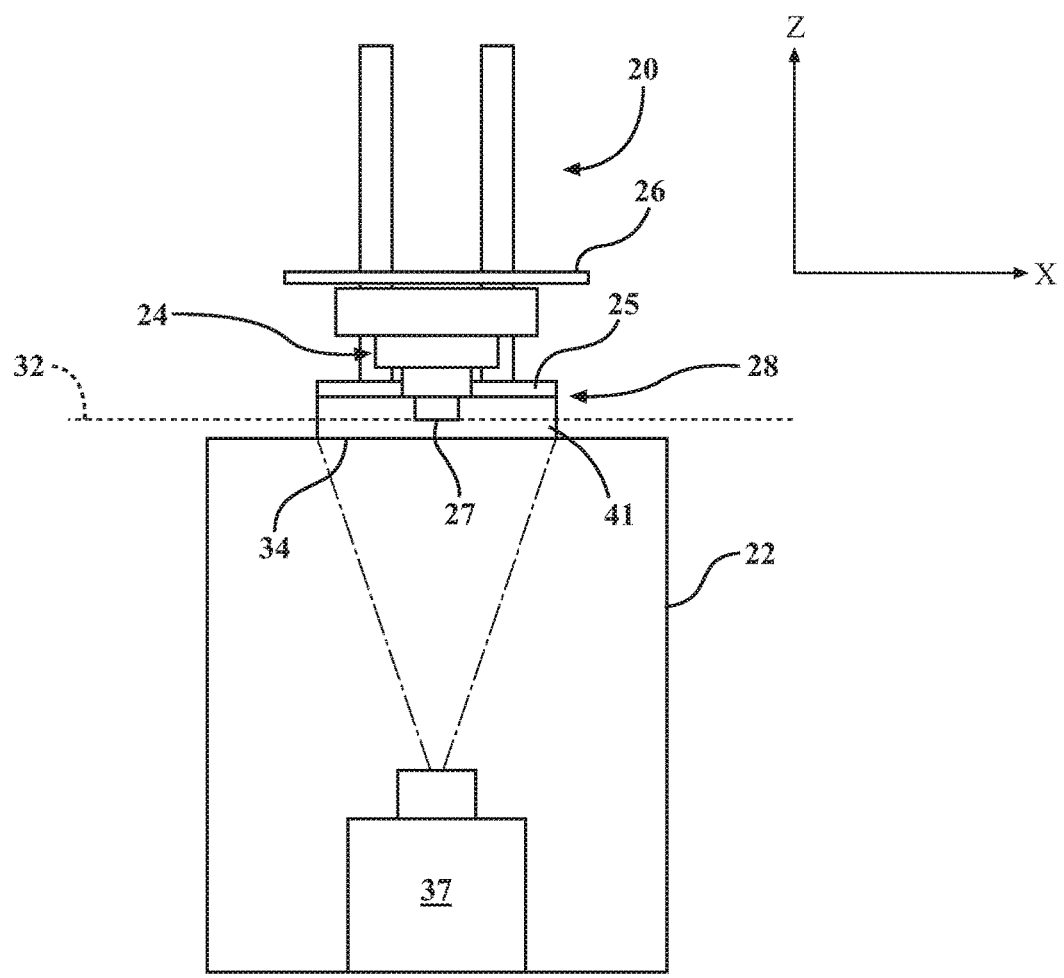
FIG. 1 is a side elevational, cross-sectional view of system for making a three-dimensional object from a solidifiable material in accordance with the present disclosure.

The Figures illustrate examples of a system and method for manufacturing. Based on the foregoing, it is to be generally understood that the nomenclature used herein is simply for convenience and the terms used to describe the invention should be given the broadest meaning by one of ordinary skill in the art.

The system and methods described herein are generally applicable to additive manufacturing of three-dimensional objects, such as components or parts (discussed herein generally as objects), but may be used beyond that scope for alternative applications. The system and methods generally involve creating a "dead zone" of non-solidification in a photohardenable material to prevent the material from solidifying against a surface of a photohardenable material container. The dead zone is created by using a photohardening inhibitor permeable film that defines the surface of the photohardenable material upon which the photohardening energy is incident. The inhibitor reacts with a photoinitiator upon entering the volume of photohardenable material at its interface with the inhibitor permeable film and prevents photohardening in a region proximate the film. That region is the dead zone. Exemplary photoinhibitors suitable for certain photohardenable liquids or resins described herein include air and oxygen. As the air and oxygen are fed through the inhibitor permeable film, the film tends to deform in the direction of inhibitor flow, causing the film to assume a shape that is similar to a dome. This deformation creates a non-planar interface between the photohardenable material and the film, which can cause the resulting three-dimensional objects to deviate from the computer data that originally defined them.

In accordance with a first aspect of the present disclosure, a photohardening inhibitor delivery device is provided which comprises a photohardening inhibitor reservoir that comprises an inlet channel in fluid communication with a continuous chamber, the continuous chamber having an open top. The device also includes a flexible film that is permeable to the photohardening inhibitor and attached to the photohardening inhibitor reservoir, the flexible film having a first side that faces the continuous chamber, and a second side that faces away from the continuous chamber, wherein the flexible film encloses the open top of the continuous chamber. A plurality of supports are provided within the continuous chamber, wherein each support is attached to the film and the photohardening inhibitor reservoir. In certain examples, the flexible film is elastomeric. In the same or other examples, the flexible film comprises a polydimethylsiloxane (PDMS) film or a fluoropolymer.

In other examples, a method of using the apparatus is provided which comprises supplying a photohardening inhibitor through the continuous chamber and to the flexible film such that the photohardening inhibitor permeates the flexible film. A previously formed object surface is immersed into a volume of photohardenable material such that the previously formed object surface is spaced apart from the flexible film. Solidification energy is supplied in a pattern corresponding to a cross-section of the three-dimensional object through the flexible film to form a currently exposed object surface that is spaced apart from the flexible film, wherein during the step of supplying solidification energy, the photohardening inhibitor prevents the photohardenable material from solidifying within a zone of solidification that includes the film/material interface. In the same or other examples, the previously formed object surface is attached to a build platform that moves along a build axis, and during the step of supplying solidification energy, the build platform continuously moves away from the flexible film along the build axis. In certain examples, the photohardening inhibitor reservoir is attached to a rigid or semi-rigid transparent base.

In accordance with a second aspect of the present disclosure, a polydimethylsiloxane inhibitor reservoir is provided which comprises sidewalls and a bottom that define a chamber having an open top. The reservoir further comprises an inlet channel and a plurality of supports, wherein the inlet channel is in fluid communication with the chamber top. A polydimethylsiloxane film is attached to the supports and encloses the chamber. In certain examples, the chamber is continuous. In additional examples, the polydimethylsiloxane inhibitor reservoir is attached to a transparent base.

In further examples, the polydimethylsiloxane inhibitor reservoir and flexible film are part of a photohardenable material container assembly. The photohardenable material container assembly includes a lower enclosure having a base that defines an enclosed opening, and the transparent base that is attached to the polydimethylsiloxane inhibitor reservoir defines the bottom of the photohardenable material container assembly. The photohardenable material container assembly also includes an upper enclosure attached to the lower enclosure, and the assembly also includes an enclosed channel that extends around the rigid or semi-rigid transparent base for supplying the photohardening inhibitor to the chamber.

The system is generally used for manufacturing three-dimensional objects from a solidifiable material and rapid prototyping. A pattern generator (such as a digital light projector, laser, LCD, LED array, etc.) provides an image to the material to selectively solidify it.

As discussed herein, a solidifiable material is a material that when subjected to energy, wholly or partially hardens. This reaction to solidification or partial solidification may be used as the basis for constructing the three-dimensional object. Examples of a solidifiable material may include a polymerizable or cross-linkable material, a photopolymer, a photo powder, a photo paste, or a photosensitive composite that contains any kind of ceramic based powder such as aluminum oxide or zirconium oxide or ytteria stabilized zirconium oxide, a curable silicone composition, silica based nano-particles or nano-composites. The solidifiable material may further include fillers. Moreover, the solidifiable material may take on a final form (e.g., after exposure to the electromagnetic radiation) that may vary from semi-solids, solids, waxes, and crystalline solids. A photohardenable material is a material that—when subjected to electromagnetic energy of a particular intensity and for a particular duration—hardens through polymerization and/or cross-linking (curing).

When discussing a photopolymerizable, photohardenable, photocurable, or solidifiable material, any material is meant, possibly comprising a resin and optionally further components, which is solidifiable by means of supply of stimulating energy such as electromagnetic radiation. Suitably, a material that is polymerizable and/or cross-linkable (i.e., curable) by electromagnetic radiation (common wavelengths in use today include UV radiation and/or visible light) can be used as such material. In an example, a material comprising a resin formed from at least one ethylenically unsaturated compound (including but not limited to (meth) acrylate monomers and polymers) and/or at least one epoxy group-containing compound may be used. Suitable other components of the solidifiable material include, for example, inorganic and/or organic fillers, coloring substances, viscose-controlling agents, etc., but are not limited thereto.

When photopolymers are used as the solidifiable material, a photoinitiator is typically provided. The photoinitiator absorbs light and generates free radicals which start the polymerization and/or crosslinking process. Suitable types of photoinitiators include metallocenes, 1, 2 di-ketones, acylphosphine oxides, benzyldimethyl-ketals, α-amino ketones, and α-hydroxy ketones. Examples of suitable metallocenes include Bis (eta 5-2, 4-cyclopenadien-1-yl) Bis [2,6-difluoro-3-(1H-pyrrol-1-yl) phenyl] titanium, such as Irgacure 784, which is supplied by Ciba Specialty chemicals. Examples of suitable 1,2 di-ketones include quinones such as camphorquinone. Examples of suitable acylphosphine oxides include bis acyl phosphine oxide (BAPO), which is supplied under the name Irgacure 819, and mono acyl phosphine oxide (MAPO) which is supplied under the name Darocur® TPO. Both Irgacure 819 and Darocur® TPO are supplied by Ciba Specialty Chemicals. Examples of suitable benzyldimethyl ketals include alpha, alpha-dimethoxy-alpha-phenylacetophenone, which is supplied under the name Irgacure 651. Suitable α-amino ketones include 2-benzyl-2-(dimethylamino)-1-[4-(4-morpholinyl) phenyl]-1-butanone, which is supplied under the name Irgacure 369. Suitable α-hydroxy ketones include 1-hydroxy-cyclohexyl-phenyl-ketone, which is supplied under the name Irgacure 184 and a 50-50 (by weight) mixture of 1-hydroxy-cyclohexyl-phenyl-ketone and benzophenone, which is supplied under the name Irgacure 500.

The pattern generator(s) may be configured in a number of ways. Many may provide controlled electromagnetic radiation to provide a desired pattern. The electromagnetic radiation may include actinic light, visible or invisible light, UV-radiation, IR-radiation, electron beam radiation, X-ray radiation, laser radiation, or the like. Moreover, while each type of electromagnetic radiation in the electromagnetic spectrum may be discussed generally, the disclosure is not limited to the specific examples provided. Those of skill in the art are aware that variations on the type of electromagnetic radiation and the methods of generating the electromagnetic radiation may be determined based on the needs of the application.

Referring to FIG. 1, a system 20 for making a three-dimensional object 24 from a photohardenable material 25 is depicted. System 20 is generally configured to receive data describing the shape and appearance of the object (such as CAD data) and to create a solid object 24 in conformity with the data. System 20 includes a housing 22 in which a pattern generator 37 is disposed. Pattern generator 37 projects two-dimensional solidification energy images upward along a build (z) axis and through an opening 34 in the top of housing 22. Photohardenable material 25 is a material that when subjected to electromagnetic energy of a particular intensity and for a particular duration hardens through polymerization and/or cross-linking (curing). Each image projected by pattern generator 37 corresponds to a cross-section of three-dimensional object 24. The photohardenable material 25 is held in a photohardenable material container assembly 28 with a transparent bottom. In FIG. 1, the photohardenable material container assembly 28 is represented generally without the features of the assembly as defined in FIGS. 2A-3C.

The photohardenable material container assembly 28 is positioned over opening 34 in the top of housing 22 so that electromagnetic energy (such as UV, IR or visible light) can enter the assembly 28. At least one process computer is operatively connected to the pattern generator 37 and a build platform actuator (not shown) to provide image data to the pattern generator 37 to move the build platform 26 along the build (z) axis. One of the process computers or another computer may be provided to convert image data from one format (e.g., .stl files) to another suitable for use by the pattern generator (e.g., bitmaps).

Solidification of the photohardenable material 25 occurs in a building region that begins at a build plane 32. Build plane 32 is defined by a no n-solidification zone 41 which is a region into which solidification energy penetrates but in which the photohardenable material 25 does not harden. In certain examples, the zone of non-solidification or non-solidification zone 41 is created by feeding a photohardening inhibitor into the photohardenable material container assembly 28, or a portion thereof which holds the photohardenable material 25. In the same or other cases, the temperature of the non-solidification zone 41 is controlled to inhibit polymerization.

Figure 2A:
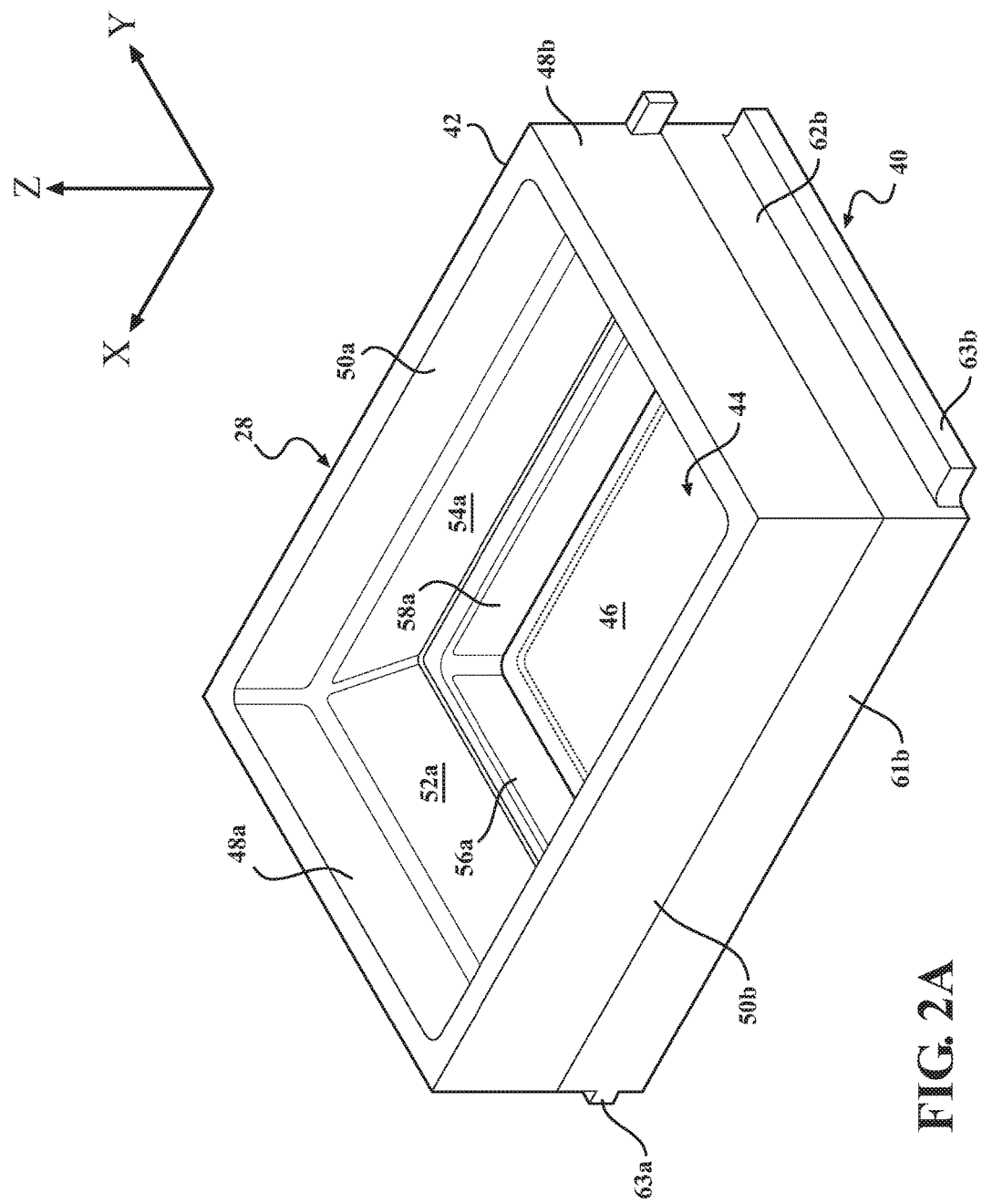
FIG. 2A is a perspective view of a first exemplary photohardenable material container assembly comprising a photohardening inhibitor delivery device that includes a stabilized photohardening inhibitor permeable film and a photohardening inhibitor reservoir.
Figure 2B:
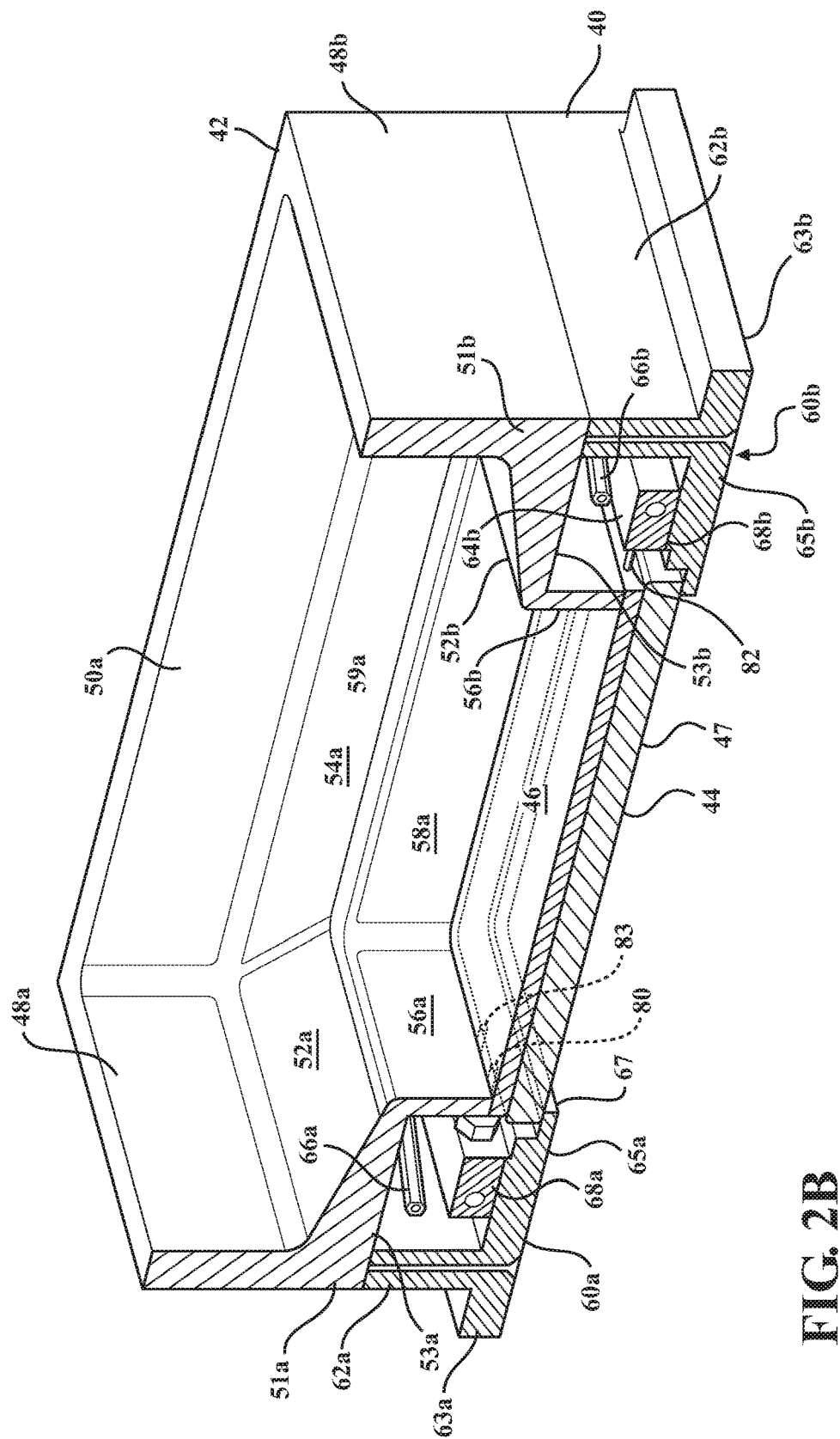
FIG. 2B is a cut-away view of the photohardenable material container assembly of FIG. 2A.

The photohardenable material container assembly 28 preferably includes a photohardening inhibitor permeable film that is supported to provide stability and prevent deformation. One exemplary configuration is shown in FIGS. 2A-2B. Container assembly 28 includes a lower enclosure 40 and an upper enclosure 42. Each enclosure 40 and 42 is defined by a closed, continuous perimeter and a central opening. The container assembly 28 also includes a photohardening inhibitor delivery device 44 that is located in the opening defined by lower enclosure 40. The photohardening inhibitor delivery device 44 is configured to deliver the photohardening inhibitor into the photohardenable material 25 and create non-solidification zone 41 while at the same time allowing solidification energy from pattern generator 37 to pass into the photohardenable material 25.

Referring to FIG. 3A, an exemplary photohardening inhibitor delivery device 44 is depicted. The photohardening inhibitor delivery device 44 comprises a photohardening inhibitor reservoir 72, a photohardening inhibitor permeable film 46, and a rigid or semi-rigid transparent substrate 70. Rigid or semi-rigid transparent substrate 70 may be constructed from materials such as transparent glass or transparent acrylic polymers. The photohardening inhibitor reservoir 72 has a bottom surface 76 that is bonded to rigid or semi-rigid transparent substrate 70. In certain examples, the bottom surface 76 is surface treated to reduce its surface energy, such as through corona plasma treatment. Bottom surface 76 is then brought into contact with substrate 70 with sufficient pressure to remove air pockets and heat treated to bond reservoir 72 to substrate 70. The photohardening inhibitor permeable film 46 is attached to a plurality of supports 74 (only one is called out in FIG. 3A) and is spaced apart from the rigid or semi-rigid transparent substrate 70 along the build (z) axis. The film 46 is substantially parallel to the x-y plane and substantially perpendicular to the build (z) axis.

The photohardening inhibitor reservoir 72 has an open top (FIG. 3B) that is preferably covered by a photohardening inhibitor permeable film 46. Photohardening inhibitor reservoir 72 and photohardening inhibitor permeable film 46 define an apparatus 45 for receiving and holding a volume of the photohardening inhibitor. FIG. 3B shows the reservoir 72 without the film 46 attached thereto. Film 46 has a first side facing the continuous chamber 78 and a second side facing upward into (and in contact with) the volume of photohardenable material in container assembly 28. The reservoir 72 comprises a solid, non-rigid, polymeric body having channels 84a, 84b and conduits 86a and 86b formed therein for receiving the photohardening inhibitor and transporting it to continuous chamber 78. Supports 74 have lengths along the build (z) axis and are arranged to define a continuous chamber 78 extending along the length (x) and width (y) axes from a first length (x) axis end 77 to a second length (x) axis end 79. The chamber 78 is "continuous" in that each part of the chamber 78 is in fluid communication with every other part of the chamber 78. In the example of FIGS. 3A-3C, the reservoir 72 includes only one chamber 78. The x-y area of the build platform 26 within which the three-dimensional object 24 may be formed is known as the "build envelope," and is generally co-extensive with the x-y area of solidification energy that is incident on build plane 32. In the example of FIGS. 1-3C, the area of the continuous chamber 78 is greater than the area defined by the build envelope, and in certain preferred examples, the length (x axis) dimension and the width (y axis) dimension of the continuous chamber 78 are each greater than the corresponding length (x axis) and width (y axis) dimensions of the build envelope. Pattern generator 37 is in optical communication with the rigid or semi-rigid transparent substrate 70 and photohardening inhibitor permeable film 46. Images transmitted from pattern generator 37 will preferably travel through substrate 70, reservoir 72, and film 46 without any appreciable distortion or alteration to maximize the accuracy of the three-dimensional object relative to the data that defines it.

Photohardening inhibitor channels 84a and 84b are in fluid communication with the continuous chamber 78 and extend to the outer surface of the reservoir 72 along the length (x) axis. Channel 84a is connected to continuous chamber 78 via angled conduit 86a, and conduit 86b is connected to continuous chamber 78 via angled conduit 86b. The angled conduits 86a and 86b are angled relative to the y-z plane. Without wishing to be bound by any theory, orienting conduits 86a and 86b at an angle relative to the y-z plane is believed to reduce the vertical momentum of the incoming photohardening inhibitor which is imparted on the film 46 and thereby reducing the likelihood of damaging film 46. Inlet catheter 80 is in fluid communication with a source of photohardening inhibitor. Outlet catheter 82 may be in fluid communication with a volume of photohardening inhibitor or the atmosphere. If pure oxygen is used as the inhibitor, is preferable to recycle it and not simply vent it to the atmosphere. At a given photohardening inhibitor pressure in the continuous chamber 78, the pressure drop in channel 84b, outlet catheter 82b and any other system components relative to the permeability of the photohardening inhibitor permeable film 46 will determine the mass flow rate of the photohardening inhibitor that passes through the film 46 relative to the mass flow rate of the inhibitor that exits through outlet catheter 82b. Thus, by providing appropriate valves on the outlet side of the reservoir 72 (e.g., in the catheter 82 or components connected downstream thereof), the relative flow rates through the film 46 and out of the outlet catheter 82 may be automatically adjusted. In certain examples, a supply pressure of photohardening inhibitor provided through inlet catheter 80 is controlled at a level that provides the desired flow rate of photohardening inhibitor through film 46 (and/or which provides the desired non-solidification zone 41 height along the build (z) axis). In certain examples, a pressure controller with an adjustable set point may be provided. In other examples, the pressure may be fixed so that a user cannot adjust it. In other cases, an optical sensor may determine the build (z) axis height of non-solidification zone 41 and may reset the set point of a supply side pressure controller to keep the non-solidification zone 41 height at a desired value. In certain cases a controller may be provided which adjusts a valve on the outlet side of the reservoir 72 (i.e., on the outlet catheter 82 or downstream components) to maintain a desired non-solidification zone 41 height along the build (z) axis. In one example, a non-solidification zone height controller may use split range control and adjust the inhibitor supply pressure up to a maximum value and then adjust a pressure downstream of a control valve on the outlet side to maintain a desired non-solidification zone height.

The photohardening inhibitor reservoir 72 is preferably made of a material that is transparent to the solidification energy (which goes through the bottom 76 of the reservoir) and sufficiently rigid to withstand the photohardening inhibitor pressure and the weight of the photohardenable material 25 on top of film 46. The reservoir 72 is also preferably substantially invulnerable to reaction or degradation from contact with the inhibitor or the photohardenable material 25. The reservoir 72 is preferably formed from a polymeric material, and more preferably from a silicone polymeric material, and still more preferably from an organo-siloxane polymer. In certain preferred examples, reservoir 72 is formed from a polydimethylsiloxane polymeric material, and more preferably is formed exclusively from a polydimethylsiloxane elastomeric material.

In one example, the reservoir 72 is molded as an integral, unitary structure with channels 84a, 84b, conduits 86a, 86b, base 73, and supports 74 as shown in FIG. 3B. One suitable PDMS for such an integrally molded structure is Sylgard® 184, a PDMS elastomer supplied by Dow Corning. Sylgard® 184 is supplied as a two part, unmixed preparation in a ratio of 10:1 base polymer to curing agent by weight. Sylgard® 184 has high transparency and is room temperature and heat curable. The reservoir 72 is structured such that the diffusion path for the photohardening inhibitor to reach the photohardenable material via film 46 is significantly shorter than via any portion of the reservoir 72. As a result, even if reservoir 72 and film 46 have the same photohardenable inhibitor permeability, the inhibitor will reach the photohardenable material via the film 46 because it offers the path of least resistance. The reservoir 72 is typically non-rigid. Thus, bonding reservoir 72 to a rigid or semi-rigid transparent substrate 70 creates a photohardening inhibitor delivery device 44 with greater rigidity and stability relative to the reservoir 72 alone.

In certain examples, photohardening inhibitor-permeable film 46 is an elastomeric film that is permeable to the photohardening inhibitor. The film 46 is preferably transparent to the solidification energy provided by pattern generator 37. Suitable materials for forming photohardening inhibitor-permeable film 46 include fluoropolymers and silicone polymers. Suitable fluoropolymers include amorphous fluoroplastic resins, such as DuPont Teflon® AF 2400. Suitable silicone polymers include organo-siloxane polymers. One preferred organo-siloxane polymer is a polydimethylsiloxane ("PDMS"). Photohardening inhibitor-permeable film 46 is bonded to reservoir 72 by surface treating both the film 46 and the reservoir 72 and laminating the film 46 to reservoir 72 using heat and pressure.

In certain examples in which air or oxygen is the photohardening inhibitor, film 46 comprises a PDMS material and has a permeability ranging from about 360 to about 660 Barrers, preferably from about 380-630 Barrers, and more preferably from about 400 to about 600 Barrers. In other examples in which air or oxygen is the photohardening inhibitor, film 46 comprises a fluoropolymer and has a permeability ranging from about 890 to about 1760 Barrers, preferably from about 940 to about 1680 Barrers, and more preferably from about 990 Barrers to about 1600 Barrers.

The permeability is a measure of mass flux through a film or membrane, normalized for the pressure drop, thickness, and area. Unlike reservoir 72, film 46 has no channels, and its permeability allows the photohardening inhibitor to pass through to the photohardenable material 25. One suitable commercially available material for forming film 46 is Sylgard®184, which may be used in the same ratio of base polymer to curing agent as the reservoir 72.

In certain cases in which film 46 comprises an elastomeric silicone film, the film 46 is hydrophobically modified, such as through surface fluorination, to reduce the tendency of the photohardenable material to adhere to or degrade it. In one implementation of such surface fluorination, hydroxyl groups are introduced onto the film 46 outer surface (the surface facing away from continuous chamber 78) by oxygen plasma treatment (such as with a corona pen). A perfluorinated silane dissolved in a perfluorinated solvent is then applied to the outer surface of film 46 to form fluorinated layers. A suitable perfluorinated solvent is perfluorotripropylamine, known as FC-3283 (CAS No. 338-83-0). Suitable perfluroinated silanes include heptadecafluoro-1,1,2,2-tetrahydrodecyl trichlorosilane.

In certain examples, the film 46 has a thickness ranging from about 0.2 to about 2.0 mm, preferably from about 0.15 to about 1.5 mm, and more preferably from about 0.25 to about 1.0 mm. In accordance with such examples, the pressure of the photohardening inhibitor (oxygen in this case) in the continuous chamber is from about 0.1 to about 1.0 psig, preferably from about 0.2 to about 0.8 psig, and more preferably from about 0.3 to about 0.5 psig. When container assembly 28 is open to the atmosphere, the side of film 46 in contact with the photohardenable material will have a gauge pressure equal to the hydrostatic head pressure (density×gravitational constant×height) corresponding to the height of photohardenable material (along the build (z) axis) in the container assembly 28. For a resin with a specific gravity of 1.2, and a liquid level of 4 cm, the pressure on the downstream side of the film 46 would be 0.07 psig. As mentioned previously, the pressure of the photohardening inhibitor in continuous chamber 78 will affect the thickness of the non-solidification zone (the distance from the build plane 32 to film 46 along the build (z) axis).

The flexible nature of film 46 will cause it to deform when subjected to the upstream photohardening inhibitor pressure. If the film 46 is supported only at the edges, then the edges will remain stationary and the greatest deformation will occur in the center of film 46. This deformation will distort the planarity of build plane 32, which will in turn cause the three-dimensional object being built to distort. To reduce such distortion and stabilize film 46, supports 74 are provided as part of reservoir 72 and are bonded to film 46 in the manner described previously for bonding film 46 to reservoir 72. In general, using the same material to form supports 74 and film 46 enhances the ability to bond supports 74 to film 46. The supports are preferably sized and arranged to maximize mass transfer of the photohardening inhibitor through film 46 without allowing film 46 to distort to an extent that would distort the three-dimensional object to an appreciable extent relative to the object data that defines it. Supports 74 are also sized and arranged to reduce the impact of refractive distortion of light passing through supports 74.

The supports 74 are preferably equidistant from one another over most, substantially all, or all, of the x-y area of the continuous chamber 78. FIG. 4 depicts a top plan view (along the build (z) axis) of the reservoir of FIG. 3B showing an exemplary portion of supports 74. In the depicted example, the supports 74 are each equidistant from all of their closest neighbors. As a result, spaces defining a plurality of rows along the x-axis and columns along the y-axis are created. One of the rows is called out as $r_1$, and one of the columns is called out as $c_1$ in FIG. 4. In the example, the supports 74 are arranged so as to define a plurality of hexagon patterns (one of which is shown with dashed lines). The continuous chamber 78 has an area defined as the open area between all of the supports 74. In one example, the supports 74 are arranged to define a support density (the percentage of the total x-y area of the chamber 78 occupied by supports) ranging from about one (1) percent to about 50 percent, preferably from about two (2) percent to about 40 percent, and more preferably from about three (3) percent to about seven (7) percent. The percentage of open area in chamber 78 is preferably from about 99 percent to about 50 percent, more preferably from about 98 percent to about 60 percent, and more preferably from about 97 percent to about 93 percent. In certain examples, the supports 74 are cylindrical and have the same diameter, which ranges from about 30 microns to about 100 microns, preferably from about 35 microns to about 80 microns, and more preferably from about 40 microns to about 60 microns. In the same or other examples, each support 74 is spaced apart from its nearest neighboring supports by a distance of from about 80 microns to about 200 microns, preferably from about 120 microns to about 180 microns, and more preferably from about 140 microns to about 160 microns.

The supports 74 have a build (z) axis height ranging from about 10 microns to about 40 microns, preferably from about 15 microns to about 35 microns, and more preferably from about 20 microns to about 30 microns. In one specific example, the supports 74 are cylindrical with a height of 25 microns, a diameter of 50 microns and have a center-to-center hexagonal spacing of 200 microns, which yields a support density of 5.7 percent and an open area of 94.3 percent.

As mentioned previously, the photohardening inhibitor delivery device 44 is a part of a photohardenable material container assembly. A first exemplary photohardenable material container assembly 28 will now be described. The other components of the photohardenable material container assembly 28 will now be described. An upper enclosure 42 and lower enclosure 40 define a photohardenable material enclosure and are attached to the photohardening inhibitor delivery device 44 to define a photohardenable material container (i.e., container assembly 28) in which the polymerization delivery device 44 acts as a closed bottom of the photohardenable material container. In preferred examples, upper enclosure 42 and lower enclosure 40 are formed from a metal.

Referring to FIGS. 2A and 2B, a lower enclosure 40 includes four vertical sidewalls 61a (not shown), 61b, 62a, and 62b. Sidewalls 61a and 61b are spaced apart along the y axis, and sidewalls 62a and 62b are spaced apart along the x axis. The sidewalls 61a, 61b, 62a, and 62b define a fully enclosed perimeter. Sidewall 62a is connected to base section 60a, and sidewall 62b is connected to base second 60b. Base section 60a includes an outward projection 63a and an inward projection 65a. Similarly, base second 60b includes an outward projection 63b and an inward projection 65b. The outward projections 63a and 63b extend away from their respective sidewalls 62a and 62b and away from central opening 47. The inward projections 65a and 65b project away from their respective sidewalls 62a and 62b in a direction toward central opening 47. Vertical sidewalls 61a (not shown) and 61b have bases with inward projections (projecting away from the corresponding sidewall and toward central opening 47) but do not have outward projections. The outward projections 63a and 63b engage corresponding slots or grooves in a structure attached to housing 22 (FIG. 1) to retain the photohardenable material container assembly 28 to the housing 22.

As shown in FIG. 2B, the inward projections 65a and 65b (along with similar projections (not shown) for sidewalls 61a (not shown) and 61b) define central opening 47. The inward projections 65a, 65b, etc. also define a distal lip 67 that encircles central opening 47. The outer perimeter of the lower surface 71 of rigid or semi-rigid, transparent substrate 70 rests on the distal lip 67, allowing the photohardening inhibitor delivery device 44 to be securely located within the central opening 47 defined by the lower enclosure 40.

Photohardening inhibitor manifolds 68a and 68b are positioned on and attached to inward projections 65a and 65b, respectively. Inlet line 66a is coupled to manifold 68a and outlet line 66b is coupled to manifold 68b. Catheters 80 and 83 (not shown) are connected to manifold 68a to distribute the photohardening inhibitor provided by inlet line 66a to the continuous chamber 78. Catheters 82 and 85 (not shown) are connected to manifold 68b and receive photohardening inhibitor and provide it to the outlet line 66b. Where four catheters are used, the channels 84a and 84b (FIGS. 3A-3C) would be sized to accommodate two catheters each or additional channels would be provided.

Upper enclosure 42 includes vertically upward sidewalls 48a, 48b, 50a, and 50b. Sidewalls 48a and 48b are spaced apart along the x-axis, and sidewalls 50a and 50b are spaced apart along the y-axis. Inward projection 51a (FIG. 2B) is attached to sidewall 48a and inward projection 51b is attached to sidewall 48b. Sidewalls 50a and 50b have similar inward projections. The inward projections 51a and 51b are spaced apart along the x axis but extend toward each other along the x axis, away from their respective sidewalls 50a and 50b and toward central opening 47. Vertically downward side wall 56a is attached to inward projection 51a and is spaced apart from vertically upward sidewall 48a along the x-axis. Inward projection 51a is located between vertically downward sidewall 56a and vertically upward sidewall 48a along the x-axis. Vertically downward side wall 56b is attached to inward projection 51b and is spaced apart from vertically upward side wall 48b along the x-axis. Inward projection 51b is located between vertically downward sidewall 56b and vertically upward sidewall 48b along the x-axis.

Vertically downward side wall 58a is attached to inward projection 59a and is spaced apart from vertically upward sidewall 50a along the y-axis. Inward projection 59a is located between vertically downward side wall 58a and vertically upward side wall 50a along the y-axis. Vertically downward sidewall 58b (not shown) is attached to inward projection 59b (not shown) and is spaced apart from vertically upward sidewall 50b along the y-axis. Inward projection 59b (not shown) is located between vertically upward sidewall 50b (not shown) and vertically downward sidewall 58b (not shown) along the y-axis.

Each inward projection 51a, 51b, 59a, 59b on the upper enclosure has a downward sloping upper surface and a substantially planar lower surface. Thus, inward projection 51a has a downward sloping upper surface 52a and a substantially planar lower surface 53a. Inward projection 51b has a downward sloping upper surface 52b and a substantially planar lower surface 53b. Inward projection 59a has a downwardly sloping upper surface 54a and a substantially planar lower surface (not shown). Inward projection 59b has a downwardly sloping upper surface (not shown) and a substantially planar lower surface (not shown). The inward projections 51a, 51b, 59a, and 59b and their corresponding downwardly sloping upper surfaces 52a, 52b, 54a, and 54b provide a means for funneling photohardenable material received by the container assembly 28 into the open area defined by central opening 47. The downwardly sloping upper surfaces 52a, 52b, 54a, 54b (not shown), and vertically downward sidewalls 56a, 56b, 58a, 58b of upper enclosure 42 cooperate with the vertically upward side walls 61a (not shown), 61b (not shown), 62a, and 62b and the inward base projections 60a, 60b (and two others, not shown) of lower enclosure 40 to define an enclosure for housing the photohardening inhibitor manifolds 68a and 68b.

In certain examples involving PDMS films, film 46 may tend to fog up if the moisture content of the photohardening inhibitor is high enough. In one example involving an oxygen, photohardening inhibitor, the oxygen supply is filtered to remove moisture before entering the continuous chamber 78.

In other examples involving PDMS films, film 46 may tend to become hazy when using certain photoinitiators. In certain cases, film 46 may become hazy during photohardening when constructed of PDMS and when the photohardenable material includes acyl phosphine oxide initiators such as Irgacure 819 (bis acyl phosphine oxide (BAPO)), and Darocur® TPO (mono acyl phosphine oxide (MAPO)). In such cases, it has been found beneficial to place a fluoropolymer film on top of the PDMS film 46 to reduce or eliminate the hazing. Preferred fluoropolymer films include amorphous fluoropolymer films. A commercial example of a suitable film is AF-2400 (discussed above). The fluoropolymer film is preferably not stretched, and in certain examples is also preferably not fixedly attached to the PDMS film 46 such by using an adhesive. In one example, the edge of the fluoropolymer film is sandwiched between the upper surface of film 46 and the bottom surface of the upper enclosure vertically downward sidewalls 56a, 58a, 56b, and 58b (not shown).

A method of using the photohardenable material container assembly 28 will now be described. In accordance with the method, photohardenable material container assembly 28 is provided and is attached to housing 22 as shown in FIG. 1. The photohardening inhibitor delivery device 44 defines the bottom of the container assembly 28. A volume of photohardenable material 25 is added to the container assembly 28. The photohardenable material 25 contacts the flexible film 46, thereby defining a film/material interface. A photohardening inhibitor is supplied through continuous chamber 78 (FIG. 3A) and to the flexible film 46 such that the inhibitor permeates the flexible film 46. A previously formed object surface 27 (FIG. 1) is immersed into the volume of photohardenable material 25 such that the previously formed object surface 27 is spaced apart from the flexible film 46 (not visible in FIG. 1). As shown in FIG. 1, previously formed object surface 27 is spaced a layer thickness away from the build plane 32 which is spaced apart from the flexible film 46 along the build (z) axis. Pattern generator 37 supplies solidification energy corresponding to a cross-section of the three-dimensional object through the flexible film 46 to form a currently exposed object surface (not shown) that is spaced apart from the flexible film 46, wherein during the step of supplying solidification energy, the photohardening inhibitor prevents the photohardenable material 25 from solidifying within a zone of non-solidification 41 that includes the film/material interface. As a result, the photohardenable material 25 does not adhere to the film 46 and does not need to be separated from it. The process is repeated until the object is complete.

Figure 5A:
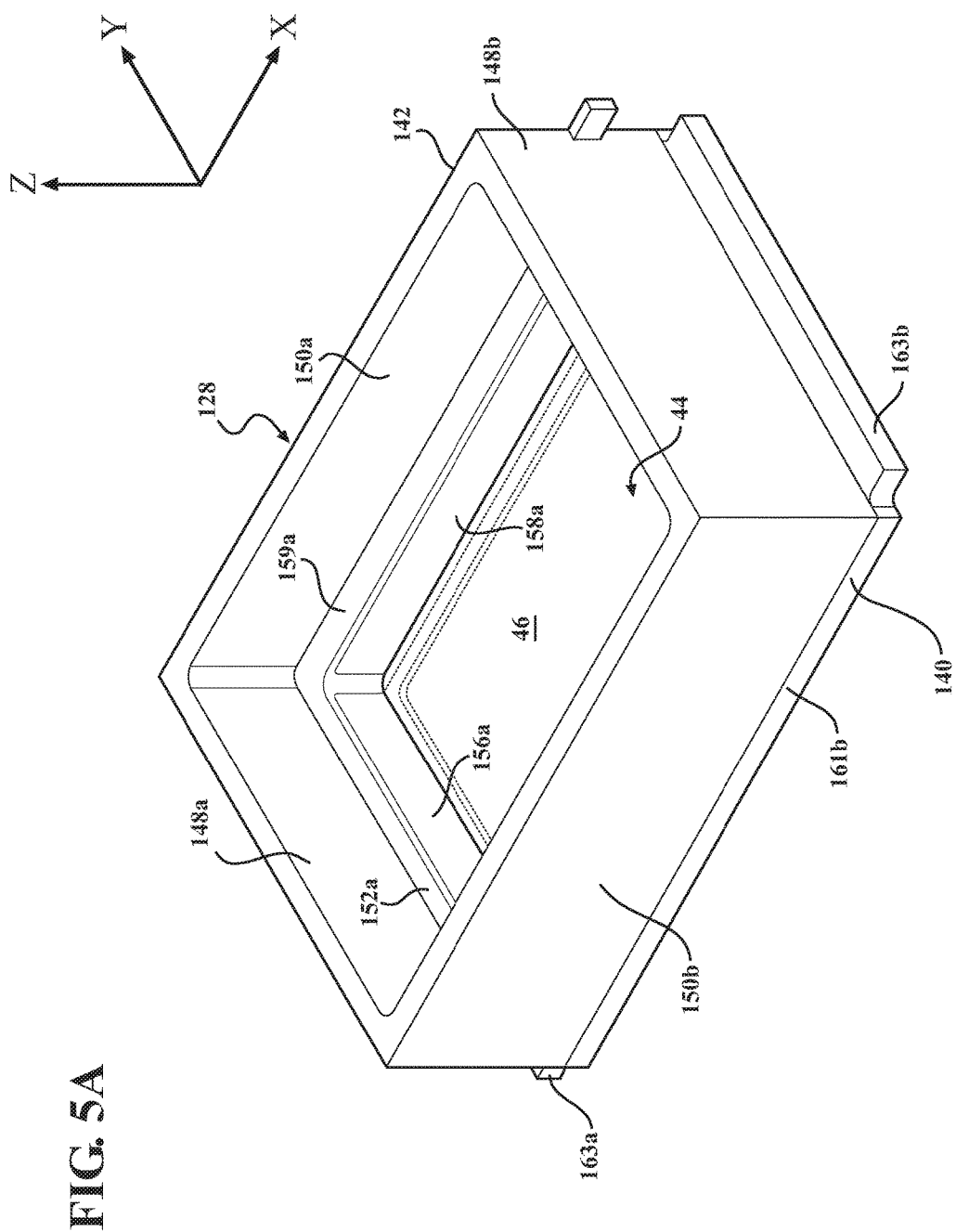
FIG. 5A is a perspective view of a second exemplary photohardenable material container assembly comprising a photohardening inhibitor delivery device that includes a stabilized photohardening inhibitor permeable film and a photohardening inhibitor reservoir.
Figure 5B:
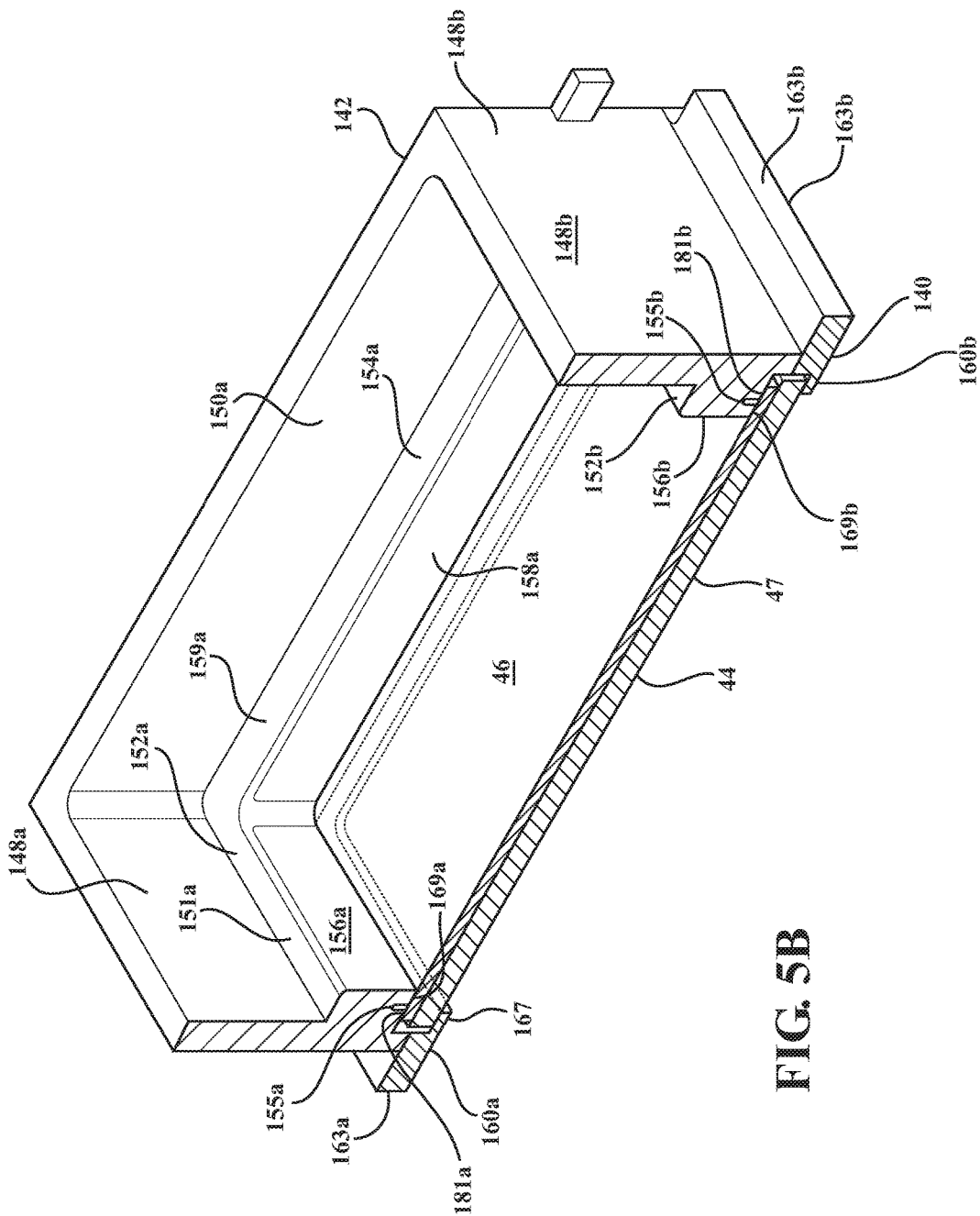
FIG. 5B is a cut-away view of the photohardenable material container assembly of FIG. 5A viewed along the y-axis.
Figure 5C:
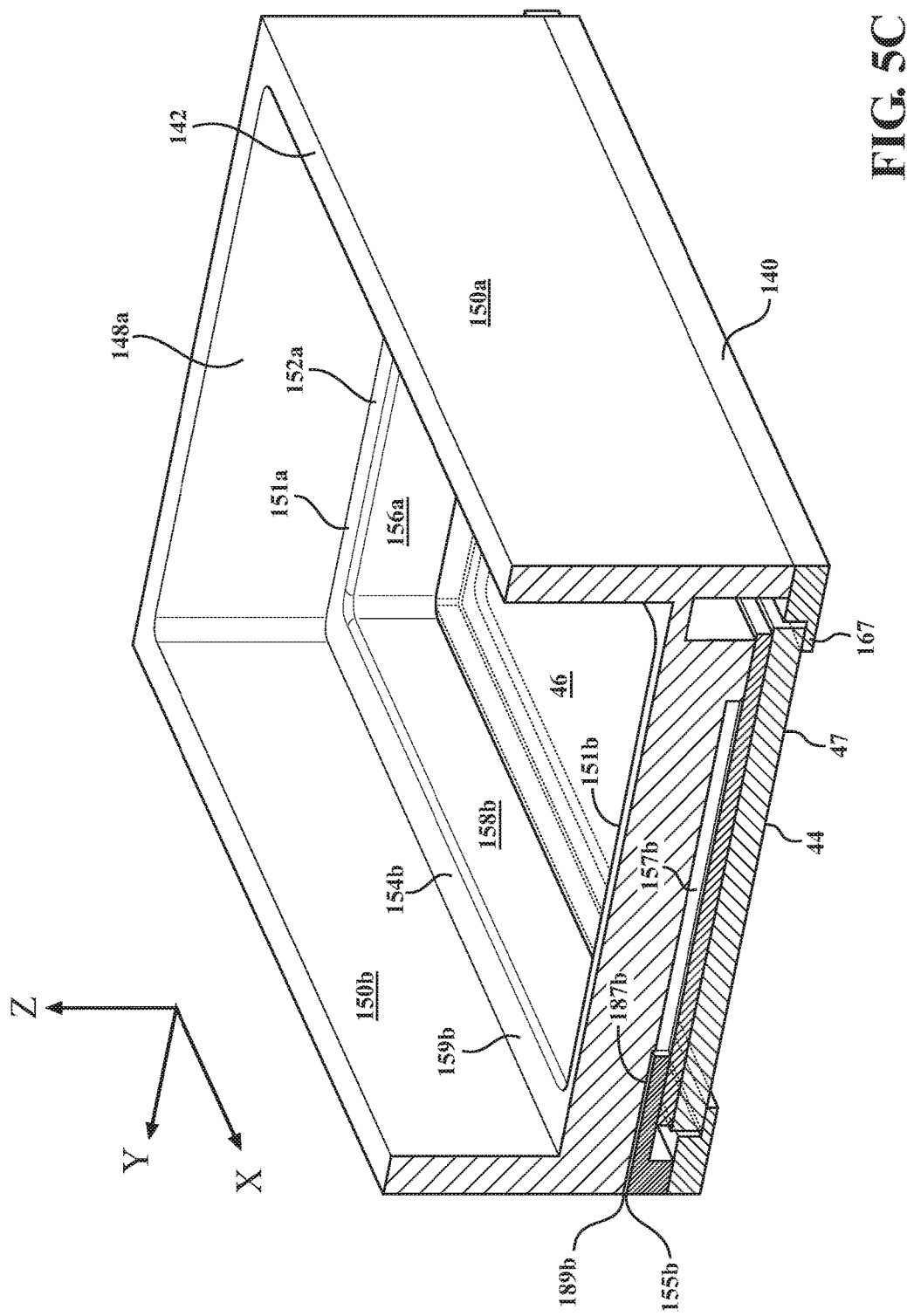
FIG. 5C is a cut-away view of the photohardening material container assembly of FIG. 5B taken through gallery 155*b* and viewed along the x-axis.

Referring to FIGS. 5A-5C, a second exemplary photohardenable material container assembly 128 will now be described. Parts that are analogous to the components of first exemplary photohardenable material container assembly 28 will be identified with the same reference numeral plus 100. An upper enclosure 142 and lower enclosure 140 define a photohardenable material enclosure and are attached to the photohardening inhibitor delivery device 44 to define a photohardenable material container (i.e., container assembly 128) in which the polymerization delivery device 44 acts as a closed bottom of the photohardenable material container 128. In preferred examples, upper enclosure 142 and lower enclosure 140 are formed from a metal.

Referring to FIGS. 5A and 5B, lower enclosure 140 includes base section 160*a*, 160*b*, 161*a* (not shown) and 161*b*. Base sections 160*a*, 160*b*, 161*a* and 161*b* define a central opening 47. The base sections 160*a*, 160*b*, 161*a* and 161*b* each define an inwardly projecting lip 167 that encircles opening 47. The inwardly projecting lip 167 allows the photohardening inhibitor delivery device 44 to be securely located within the central opening 47 defined by the lower enclosure 140.

Base section 160*a* includes an outward projection 163*a*, and base section 160*b* includes an outward projection 163*b*. The outward projections 163*a* and 163*b* engage corresponding slots or grooves in a structure attached to housing 22 (FIG. 1) to retain the photohardenable material container assembly 128 to the housing 22.

Upper enclosure 142 includes vertically upward sidewalls 148*a*, 148*b*, 150*a*, and 150*b*. Sidewalls 148*a* and 148*b* are spaced apart along the x-axis, and sidewalls 150*a* and 150*b* are spaced apart along the y-axis. Inward projection 151*a* (FIG. 5B) is attached to sidewall 148*a* and inward projection 151*b* is attached to sidewall 148*b*. Sidewalls 150*a* and 150*b* have similar inward projections. The inward projections 151*a* and 151*b* are spaced apart along the x axis but extend toward each other along the x axis, away from their respective sidewalls 150*a* and 150*b* and toward central opening 147. Vertically downward side wall 156*a* is part of inward projection 151*a*. Vertically downward side wall 156*b* is part of inward projection 151*b*. Vertically downward side wall 158*a* is part of inward projection 159*a*. Vertically downward sidewall 158*b* (not shown) is part of inward projection 159*b* (not shown).

Each inward projection 151*a*, 151*b*, 159*a*, 159*b* on the upper enclosure has a substantially planar, upward-facing (along the z-axis) surface. Thus, inward projection 151*a* has a substantially planar upward facing surface 152*a*. Inward projection 151*b* has a substantially planar upward facing surface 152*b*. Inward projection 159*a* has a substantially planar upward facing surface 154*a*. Inward projection 159*b* has a substantially planar upward facing surface 159*b* (not shown).

Unlike photohardening material container assembly 28 of FIGS. 2A-2C, assembly 128 of FIGS. 5A-5C uses galleries instead of manifolds to supply photohardening inhibitor to continuous chamber 78. Gallery 155*a* comprises a chamber drilled into inward projection 151*a*. The gallery 155*a* is a chamber bounded on three sides by the inward projection 151*a* and on the bottom by flexible film 46 of the photohardening inhibitor delivery device 44. The portion of the flexible film 46 that defines the bottom of gallery 155*a* preferably has a plurality of openings created in it so that the inhibitor can flow from the gallery 155*a* to the channel 84*a* (FIGS. 3B-3C) or vice-versa. Gallery 155*a* is defined by two downward facing surfaces 169*a* and 181*a* which tightly seal the flexible film 76 to prevent inhibitor leakage out of the gallery 155*a*. Gallery 155*b* is similarly defined by two downward facing surfaces 169*b* and 181*b* that tightly seal flexible film 76 to prevent inhibitor leakage out of gallery 155*b*. The portion of flexible film 46 that defines the bottom of gallery 155*b* preferably has a plurality of openings in it to allow the inhibitor to flow into channel 84*b* or vice-versa. The photohardening inhibitor may enter one of the two galleries 155*a* and 155*b* and exit the other of the two galleries 155*a* and 155*b*.

A side view of gallery 155*b* is provided in FIG. 5C. When it acts as a photohardening inhibitor supply gallery, gallery 155*b* includes an inlet 189*b* formed in inward projection 151*b* of sidewall 148*b* of upper enclosure 142. Gallery 155*b* also includes an inlet channel 187*b* that feeds flexible film sealing channel 157*b*. The flexible film sealing channel 157*b* is where the inhibitor flows down through openings in the flexible film 46 and into channel 84*b*. Similarly, where it acts as a photohardening inhibitor return gallery, gallery 155*a* includes an outlet 189*a* and an outlet channel 187*a* (not shown) which allows excess inhibitor to exit the photohardening inhibitor delivery device 44. The inlet 189*b* and outlet 189*a* are not shown in FIG. 5A. As with photohardenable material container assembly 28, in certain cases in which the flexible film 46 becomes hazy, it is preferably to place a fluoropolymer film over flexible film 46 such that the edges of the fluoropolymer film are sandwiched between the flexible film 46 and the downward extending vertical walls 156*a*, 158*a*, 156*b*, and 158*b* of the lower enclosure 140.

A method of using the photohardenable material container assembly 128 will now be described. In accordance with the method, photohardenable material container assembly 128 is provided and is attached to housing 22 as shown in FIG. 1. The photohardening inhibitor delivery device 44 defines the bottom of the container assembly 128. A volume of photohardenable material 25 is added to the container assembly 128. The photohardenable material 25 contacts the flexible film 46, thereby defining a film/material interface. A photohardening inhibitor is supplied via gallery inlet 189*b*, gallery 155*b*, through continuous chamber 78 (FIG. 3A) and into the flexible film 46 such that the inhibitor permeates the flexible film 46. Excess inhibitor exits through gallery 155*a* and outlet 189*a*. A previously formed object surface 27 (FIG. 1) is immersed into the volume of photohardenable material 25 such that the previously formed object surface 27 is spaced apart from the flexible film 46 (not visible in FIG. 1). As shown in FIG. 1, previously formed object surface 27 is spaced a layer thickness away from the build plane 32 which is spaced apart from the flexible film 46 by the build axis (z) height of the zone of non-solidification 41 along the build (z) axis. Pattern generator 37 supplies solidification energy corresponding to a cross-section of the three-dimensional object through the flexible film 46 to form a currently exposed object surface (not shown) that is spaced apart from the flexible film 46, wherein during the step of supplying solidification energy, the photohardening inhibitor prevents the photohardenable material 25 from solidifying within a zone of non-solidification 41 that includes the film/material interface. As a result, the photohardenable material 25 does not adhere to the film 46 and does not need to be separated from it. The process is repeated until the object is complete.

In certain preferred examples, while the pattern generator 37 is supplying solidification energy to the photohardenable material 25, the build platform 26 continues to move upward and away from the photohardenable material container 28 along the build (z) axis. The creation of a zone of non-solidification 41 enables the movement of build platform 26 as solidification is occurring because separation of solid photohardenable material from the film 46 is not required.

In other preferred examples, discontinuous movement of the build platform 26 is used. In certain implementations, the build platform 26 remains stationary when the pattern generator 37 supplies solidification energy into the photohardenable material. After a given layer is solidified, the build platform 26 moves upward (along the build (z) axis)(by an amount greater than the solidified layer thickness and then moves downward (along the build (z) axis) until the exposed (downward-facing) object surfaced is spaced apart from the zone of non-solidification 41 by the layer thickness. This up and down movement is particularly useful in those examples in which a loose film (such as a fluoropolymer film sitting on flexible film 46) is used. As mentioned previously, fluoropolymer films are particularly useful as loose films sitting on a flexible film 46 comprising PDMS to combat the formation of haze that occurs with PDMS films and certain photoinitiators, such as acylphosphine oxides. The loose film is sandwiched between the upper enclosure 42, 142 and the flexible film 46 at its edges but is not fixedly attached to the upper enclosure 42, 142 or the flexible film 46. As a result, the loose film can stretch in the middle, whereas flexible film 46 is adhered to supports 74. As a result, when the build platform 26 moves up along the build (z) axis (away from the flexible film 46), the interior region of the loose film may deform upward along the build (z) axis. The up and down movement resets the loose film to a substantially flat configuration. Maintaining the loose film in a flat configuration minimizes inaccuracies in the resulting three-dimensional object. In certain examples involving flat surfaces over two inches by two inches, the technique is especially preferred. In some implementations, the speed of build platform movement up and down ranges from about 15 to about 120 microns per second, preferably from about 20 to about 110 microns per second, and more preferably from about 25 to about 100 microns per second. In the same or other examples, the build platform 26 is moved upward by an amount ranging from about 300 microns to about 2 mm, preferably from about 250 microns to 1.5 mm, and more preferably from about 250 microns to about 1 mm before moving down to a distance one layer thickness from the non-solidification zone 41.

During the step of supplying solidification energy through the flexible film 46, the solidification energy travels through the rigid or semi-rigid transparent substrate 70, through the base 73 of photohardening inhibitor reservoir 72, into continuous chamber 78, and through the film 46. Because the supports 74 are transparent, they allow the image to pass through them without appreciable distortion on the image or impact on the resulting three-dimensional object. However, some distortion may occur in the portions of the image passing through the supports 74 relative to portions passing through the open area of continuous chamber 78 because the index of refraction of the support 74 material differs from the index of refraction of the oxygen in the continuous chamber 78. In preferred examples, the number of supports 74, their distribution, and their individual sizes are selected to minimize image distortion while at the same time providing enough support to maintain film 46 in a substantially planar configuration. In particular, the diameter and length of the supports 74 are preferably minimized to reduce the amount of image distortion. The diameter impacts the amount of light that travels through and is refracted by each support, while each support length determines the optical path length and the extent to which any particular ray of light is diffracted.

The pressure of the photohardening inhibitor in continuous chamber 78 is preferably set at a value that ensures that the zone of non-solidification 41 between build plane 32 and film 46 is maintained. If the build platform 26 moves continuously upward along the build (z) axis, the speed is preferably set or controlled to ensure that there is no delamination along the build (z) axis. If the build platform 26 moves too quickly, solidification of a current section may occur too late relative to a previous section, causing delamination. If the pressure of the photohardening inhibitor in continuous chamber 78 is set to too low, the build plane 32 will coincide with the film 46 causing the photohardenable material to solidify in contact with the film 46, requiring separation of the solidified material from the film 46.

As an alternative to directly feeding oxygen gas to the flexible film, an oxygen saturated carrier liquid may also be used. The liquid acts as a carrier for the photoinhibitor (e.g., oxygen), and within continuous chamber 78, the photoinhibitor diffuses from the carrier liquid, across flexible film 46 and into the photohardenable material 25.

Suitable carrier liquids include fluorinated oil, such as perfluorocarbons, and perfluoropolyethers. Exemplary perfluorocarbon carrier liquids include perfluorohexane and perfluorodecalin. Perfluorohexane has an oxygen solubility (at 25° C.) of 69 mL oxygen per 100 mL perfluorohexane. Perfluorodecalin has an oxygen solubility (at 25° C.) of 49 mL oxygen per 100 mL perfluorodecalin.

Exemplary perfluoropolyethers include Galden-HT55, a pefluoropolyether heat transfer fluid supplied by Solvay SA of Belgium. Galden-HT55 has an air solubility (at 25° C.) of 26 mL air per 100 mL fluid). The carrier liquid may be introduced at a temperature lower than that of flexible film 46, which will tend to increase the non-solidification zone 41 height along the build (z) axis. It will also keep the reservoir 72 continuous chamber 78 cleaner and clearer. In certain implementations, the liquid could be selected so that when saturated with oxygen, its refractive index is close to that of the reservoir 72 material (e.g., an index of about 1.4 in the case of PDMS) to reduce any image distortion produced by the refraction of the pattern generator 37 light by supports 74.

Figure 6:
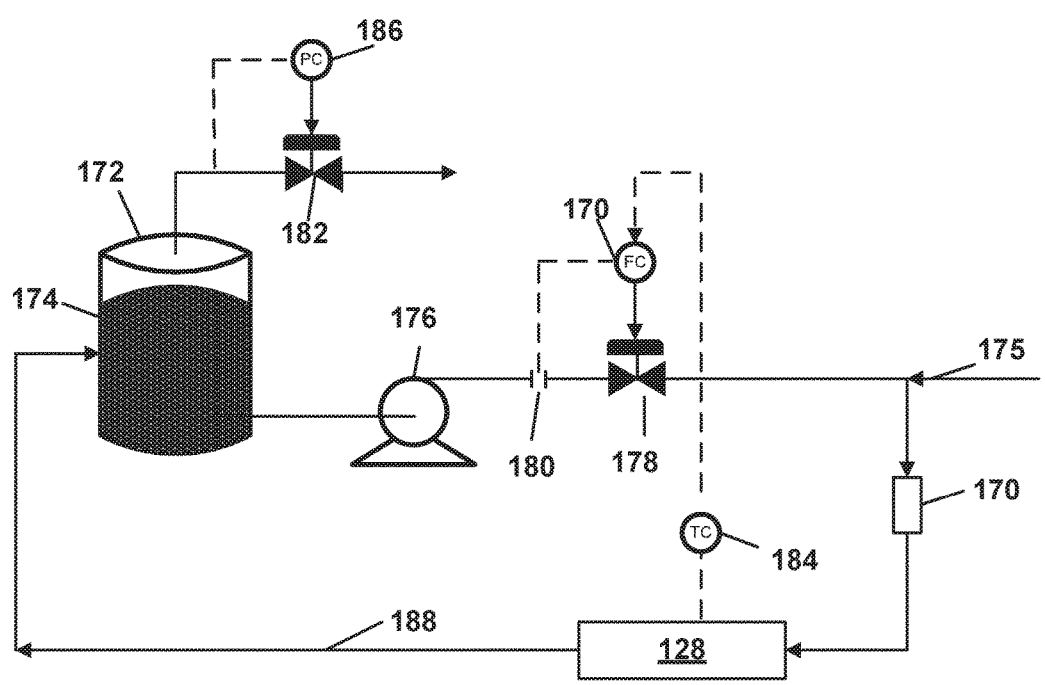
FIG. 6 is a system diagram of a system for delivering an oxygen saturated fluid to a photohardenable material container.

A system for delivering a photoinhibitor saturated fluid to a photohardenable material container assembly 128 (or 28) is depicted in FIG. 6. Reservoir 172 holds a volume of carrier liquid 174. In some examples, reservoir 172 may be open to the atmosphere. In the example of FIG. 6, the reservoir 172 is pressure controlled using pressure controller 186 which manipulates pressure control valve 182 to adjust the amount of gas vented from reservoir 172 and hold the pressure of reservoir 172 at a desired value. Pump 176 pumps carrier liquid 174 through flow control valve 178, after which photoinhibitor stream 175 is injected into the carrier liquid (e.g. using an oxygen bubbler). The inhibitor/carrier liquid stream then passes through a bubble trap 170 to remove bubbles before entering the photohardening inhibitor delivery device 44 (not visible in FIG. 6) within photohardenable material container assembly 128 (or 28). Exemplary bubble traps include the Cole-Parmer Inline Bubble trap made of PTFE and PEEK.

The carrier liquid/inhibitor will pass through gallery 155*b* and into continuous chamber 78, from which the inhibitor will diffuse out of the carrier liquid, across the flexible film 46, and into the photohardenable material 25. The remaining carrier liquid will exit at gallery 155*a*. If photohardenable material container assembly 28 is used, the carrier liquid will enter and exit via the manifolds 68*a* and 68*b*. Contaminants within the photohardenable material 25 may diffuse from the volume of photohardenable material proximate flexible film 46 and into the carrier liquid 174 to exit photohardenable material container assembly 128 at exit stream 188. Such contaminants may include those that cause flexible film 76 to develop a haze.

In one example, the flow rate of the carrier liquid 172 may be used to control the temperature of the side of the flexible film 46 facing into continuous chamber 78. In addition to or instead of using the carrier liquid flow rate to control the temperature of the flexible film 46, a cooling element may be provided to cool the carrier liquid stream. The cooling element is preferably located upstream of the bubble trap 170, such as proximate the inlet of bubble trap 170 or at reservoir 172. Cooling the carrier liquid can reduce the oxygen solubility and cause bubble formation. Thus, it is preferable to introduce the cooling prior to the bubble trap 170. A thermocouple may be attached to the flexible film 46 to provide a temperature reading to temperature controller 84. Alternatively, the thermocouple may be placed in the photohardenable material proximate flexible film 46. The temperature of flexible film 46 may provide an indirect indication of the temperature of the photohardenable material 25, and by controlling the temperature, the build (z) axis height of the non-solidification zone 41 can be controlled. In one exemplary control scheme, temperature controller 184 is cascaded to a flow controller 170 which controls the flow rate measured by flow meter 180 by manipulating control valve 178. In another example, the temperature controller 184 may directly manipulate control valve 178 without being cascaded to an intervening controller. In either case, the flow rate of carrier liquid 174 is manipulated to control the temperature of the flexible film 46 and the photohardenable material 25 proximate flexible film 46.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their r equivalents, rather than by the preceding description.

What is claimed is:

1. A method of making a three-dimensional object from a photohardenable material, the method comprising:
providing a photohardenable material container comprising an upper enclosure and a lower enclosure, and comprising a container bottom defined by a photohardening inhibitor delivery device, wherein the photohardenable material container holds a volume of photohardenable material, and wherein the photohardening inhibitor delivery device comprises:
a photohardening inhibitor reservoir comprising sidewalls and a base that define a continuous chamber having a plurality of supports and an open top, the reservoir further comprising an inlet channel, with the base, the sidewalls, and the supports defining an open area of the continuous chamber, wherein the inlet channel is in fluid communication with the open top via the open area, and wherein the reservoir is an integral unitary structure of the base, the inlet channel, the sidewalls, and the supports, with the inlet channel being defined within the body of the base and being spaced away from the open area along a build axis, and with the inlet channel extending to a side surface of the reservoir distinct from the open top;
a flexible first film attached to the supports and enclosing the open top of the continuous chamber; and
a second film on top of the flexible film;
solidifying a first layer of the photohardenable material at a distance from the second film along the build axis by exposure to electromagnetic radiation so as to become attached to a bottom surface of a build platform submerged into the volume of the photohardenable material held within the container, the attached first layer having a first exposed object surface within the volume of photohardenable material and having a layer thickness;
moving the build platform with the first layer attached thereto along the build axis away from the second film by a first distance greater than the layer thickness;
moving the build platform along the build axis back toward the second film by a second distance, wherein the second distance is equal to the first distance less the layer thickness;
solidifying a second layer of the photohardenable material by exposure to electromagnetic radiation so as to become attached to the first exposed object surface, the second layer having a second exposed object surface and having the layer thickness; and
forming the three-dimensional object by repeating each of the moving steps in sequence and the second-layer solidifying step so as to form one or more additional layers of the photohardenable material attached in sequence to the second exposed surface,
wherein during the solidifying steps for each of the first, second, and one or more additional layers, photohardenable inhibitor is fed through the flexible first film and the second film via the inlet channel and open area of the photohardening inhibitor reservoir so as to create a non-solidification zone of the photohardenable material extending from the second film within the photohardenable material container.

2. The method of claim 1, wherein the flexible film is an elastomeric film.

3. The method of claim 1, wherein the flexible film is a polydimethylsiloxane (PDMS) film.

4. The method of claim 3, wherein the second film is a fluoropolymer film.

5. The method of claim 1, wherein the flexible film is a surface fluorinated polydimethylsiloxane (PDMS) film.

6. The method of claim 1, wherein the flexible film is a polydimethylsiloxane film having an oxygen permeability ranging from about 360-660 Barrers.

7. The method of claim 1, wherein the flexible film is a fluoropolymer film.

8. The method of claim 1, wherein the flexible film is a fluoropolymer film having an oxygen permeability ranging from about 890 Barrers to about 1760 Barrers.

9. The method of claim 1, wherein the second film is in contact with the photohardenable material held in the photohardenable material container at a film/material interface from which the non-solidification zone is defined.

10. The method of claim 1, wherein the supports have a height along a height axis, and wherein each of the supports is spaced apart from its nearest neighboring ones of the supports along a length axis and a width axis, thereby defining a plurality of open rows of the open area having lengths along the length axis and a plurality of open columns of the open area having lengths along the width axis.

11. The method of claim 1, wherein each of the supports has a diameter ranging from about 30 microns to about 100 microns.

12. The method of claim 1, wherein each of the supports is spaced apart from its nearest neighboring ones of the supports by a distance of from about 80 microns to about 200 microns.

13. The method of claim 1, wherein each of the supports has a height and a cross-sectional area perpendicular to the height, wherein the continuous chamber has a height parallel to the height of each of the supports and has an area parallel to the cross-sectional area of each of the supports, and wherein the supports occupy from about 1 to about 50 percent of an area of the continuous chamber consisting of the supports and the open area.

14. The method of claim 1, wherein the supports contact from about 1 to about 50 percent of the area of the flexible film.

15. The method of claim 1, wherein the photohardening inhibitor reservoir is formed from a polydimethylsiloxane (PDMS).

16. The method of claim 1, wherein the photohardening inhibitor reservoir is integrally molded to form the integral unitary structure of the base, the inlet channel, the sidewalls, and the plurality of supports.

17. The method of claim 1, wherein the photohardening inhibitor reservoir has a bottom, wherein the reservoir bottom has a first side facing and defining a part of the continuous chamber and a second side facing away from the continuous chamber, and wherein the photohardening inhibitor delivery device further comprises a rigid or semi-rigid, transparent base attached to the second side of the bottom of the photohardening inhibitor reservoir.

18. The method of claim 1, wherein the upper and lower enclosures are each formed from a metal.

19. The method of claim 1, wherein the lower enclosure is attached to the photohardening inhibitor delivery device.

20. The method of claim 1, wherein the lower enclosure has a base that defines an enclosed opening, with the photohardening inhibitor delivery device being located in the enclosed opening, and with an enclosed channel extending around the enclosed opening supplying the photohardening inhibitor to the continuous chamber via the inlet channel.

21. The method of claim 20, wherein a photohardening inhibitor manifold supplying the photohardening inhibitor to the inlet channel is located in the enclosed channel.

22. The method of claim 1, wherein the photohardening inhibitor comprises oxygen.

23. The method of claim 1, wherein the photohardening inhibitor is fed to the inlet channel from a source of the photohardening inhibitor.

24. The method of claim 23, wherein the source of the photohardening inhibitor comprises an oxygen-saturated liquid.

25. The method of claim 24, wherein the liquid is one selected from perfluorohexane, perfluorodecalin, and a perfluoropolyether.

26. The method of claim 24, wherein a temperature controller is operatively connected to a cooling element so as to cool the liquid.

27. The method of claim 24, wherein a temperature controller is operatively connected to a control valve so as to adjust a flow rate of the liquid to the inlet channel.

28. The method of claim 1, wherein the electromagnetic radiation applied during the solidifying steps for each of the first, second, and one or more additional layers is controlled by a pattern generator providing the electromagnetic radiation in a desired pattern.

29. The method of claim 1, wherein said exposure to electromagnetic radiation for solidifying each of the first, second, and one or more additional layers is applied from below the photohardening inhibitor delivery device through the base and continuous chamber thereof and through the first and second films.

30. The method of claim 1, wherein said electromagnetic radiation is ultraviolet light.

31. The method of claim 1, wherein said fluid communication between the inlet channel and open top is provided by way of a conduit defined within the body of the base connecting the inlet channel to the open area, the conduit being arranged between the inlet channel and the open area along the build axis.

* * * * *